Patented June 10, 1952

2,599,762

UNITED STATES PATENT OFFICE 2,599,762

POTTING COMPOSITION

Charles W. Kleiderer, Hyattsville, Md., assignor to the United States of America as represented by the Secretary of the Navy No Drawing. Application September 17, 1945, Serial No. 616,973

4 Claims. (Cl. 106—171)

An object of the present invention is to provide a new composition of matter which is particularly adapted for use as a potting or sealing composition for use as a hot dip in the electrical arts.

Another object of the invention is to provide a potting composition which is capable of being melted and poured at relatively high temperatures above the boiling point of water, such as in the neighborhood of 350° F., and moreover will have a softening point above 200° F.

A further object of the invention is to provide a potting composition which will be extremely tough, unyieldable and tenacious at ordinary temperatures and yet will not become brittle and/or flake and crack at low temperatures such as 0° F.

Still another object of the invention is to provide a potting composition which will have desirable physical and chemical characteristics, such as high impact strength, chemical stability, dimensional stability, extreme water resistance, good low temperature characteristics, good dielectric properties, good adhesive characteristics and compatibility with other plastic materials such as ethyl cellulose, Vinylite and phenolic type resins.

These and other objects of the invention will be understood by reference to the following description.

In accordance with the present invention, there is provided a novel potting compound which comprises a major proportion of paraffin, hydrogenated castor oil, and ethyl cellulose and a minor proportion of hydroquinone mono-benzyl ether.

It is preferred to use as a solvent a particular hydrogenated castor oil known as "Opal-Wax" manufactured by the E. I. du Pont de Nemours & Co. Inc. The paraffin which is to be used as a body for the present potting compound is preferably one having a melting point ranging from 123° F. to 140° F. As the ethyl cellulose constituent, it is preferred to use the pure, uncompounded product known as ethyl cellulose flake and having an ethoxyl content ranging from 46.8% to 48.5%. Ethyl cellulose flake having this ethoxyl range is manufactured by the Hercules Powder Company under the brand designations "N-22, N-50 and N-100." As the hydroquinone mono-benzyl ether stabilizer, it is preferred to use "Age-Rite Alba" manufactured by the R. T. Vanderbilt and Company.

The percentage composition of the present potting compound may be varied within limits as follows:

|   | Per cent by weight |
| --- | --- |
| Ethyl cellulose flake | From 20 to 30 |
| Hydrogenated castor oil | From 35 to 40 |
| Paraffin | From 35 to 40 |
| Hydroquinone mono-benzyl ether | From 0.5 to 2.0 |

It will be understood that the physical and chemical properties of the compositions compounded within the above limits will not be identical; that is, although all the inherent properties will be present, a particular property may be improved at the expense of another. Thus, by varying the composition within the limits prescribed above, a variety of requirements may be met.

The preferred process of making the present potting compound comprises melting together the paraffin, the hydrogenated castor oil and the hydroquinone mono-benzyl ether; then adding the ethyl cellulose flake and stirring the composition until it is dissolved. The preferred composition which has proven most satisfactory is substantially as follows:

Example 1

|   | Per cent |
| --- | --- |
| Ethyl cellulose flake (Hercules Brand N–100) (containing 46.8 to 48.5% ethoxyl) | 25 |
| Hydrogenated castor oil ("Opal-Wax") | 37 |
| Paraffin (M. P. 140° F.) | 37 |
| Hydroquinone mono-benzyl ether ("Age-Rite Alba") | 1 |

Example 2

In this example, the same percentage and components as shown in Example 1 above are used with the exception that ethyl cellulose flake Hercules Brand "N-22" is used in place of the Hercules Brand "N-100."

Example 3

The same percentage and components shown in Example 1 above are used with the exception that the ethyl cellulose flake Hercules Brand "N-100" is replaced by Hercules Brand "N-50."

Samples of the potting compounds shown above were melted and poured into a vessel made of compounded and plasticized ethyl cellulose. The potting compounds were allowed to cool and were then reheated to the boiling point of water and were sustained at this temperature for several hours. It was observed that the potting compound remained securely bonded to the ethyl cellulose vessel and did not exhibit any tendency to loosen or separate therefrom. The potting compounds were then cooled and the vessels were subjected to severe impact, such as by hammer blows. Upon examination it was found that the composition maintained its bond with the vessel and showed no sign of yielding or cracking.

The physical appearance of the potting compound is very similar to that of wax and inasmuch as it contains from 70 to 80% hydrogenated castor oil and paraffin, it might be expected that the compound would be yieldable and would soften upon being held in the hand. However, contrary to all expectations, the potting compound was found to be extremely tough at ordinary temperatures and could be dented only slightly with a sharp object.

The samples were heated to 200° F. and while at this temperature were subjected to centrifugal force of the high order present in a projectile fired from a rifled gun and it was observed that the compound did not spin into threads or filaments nor did it flow to any appreciable extent.

Samples of the potting compounds shown in the above samples were heated to about 350° F. and it was found that they were sufficiently fluent to be poured readily into cavities and molds. It was further observed that the present potting compounds adhered tenaciously to plastic bodies of ethyl cellulose, Vinylite and Bakelite type plastics when solidified in contact therewith. Small electrical units including rectifiers, terminals, capacitors, vacuum tube bases and the like were completely imbedded in the potting compound by molding under pressure. After removal from the mold, it was observed that moistureproof articles were obtained by this method.

What is claimed is:

1. A potting composition consisting of, solid hydrogenated castor oil, paraffin having a melting point ranging from approximately 123° F. to 140° F., ethyl cellulose having an ethoxyl content ranging from 46.8% to 48.5%, and .5% to 2.0% hydroquinone mono-benzyl ether.

2. A potting composition comprising by weight approximately 35% to 40% hydrogenated castor oil, 35% to 40% paraffin having a melting point ranging from about 123° F. to 140° F., approximately 20% to 30% ethyl cellulose having an ethoxyl content ranging from 46.8% to 48.5% and 0.5% to 2.0% hydroquinone mono-benzyl ether.

3. A potting composition comprising by weight approximately 37% hydrogenated castor oil, 37% paraffin having a melting point ranging from about 123° F. to 140° F., 25% ethyl cellulose having an ethoxyl content ranging from 46.8% to 48.5% and 1.0% hydroquinone mono-benzyl ether.

4. A potting composition comprising by weight approximately three-eighths each of paraffin and Opal Wax, and one-quarter of ethyl cellulose, with approximately 1% of hydroquinone mono-benzyl ether.

CHARLES W. KLEIDERER.

REFERENCES CITED

The following references are of record in the file of this patent:

UNITED STATES PATENTS

| Number | Name | Date |
| --- | --- | --- |
| 2,241,706 | Kropscott | May 13, 1941 |
| 2,264,316 | Kauppi et al. | Dec. 2, 1941 |
| 2,349,134 | Bradshaw | May 16, 1944 |
| 2,389,370 | Koch | Nov. 20, 1945 |
| 2,453,214 | Figdor | Nov. 9, 1948 |
| 2,490,100 | Smith | Dec. 6, 1949 |

OTHER REFERENCES

Peck et al., "Jour. Invest. Derm." 4 (1941) 325–9. The Williams and Wilkins Co., Mt. Royal and Guilford Aves., Baltimore 2, Maryland.

"Hercules Ethyl Cellulose, Properties and Uses," March 1944, Hercules Powder Co., Wilmington, Del., pages 15 and 34.